United States Patent
Baxter et al.

(10) Patent No.: US 10,882,001 B2
(45) Date of Patent: Jan. 5, 2021

(54) METHOD FOR REMOVING A FOULANT FROM A GAS STREAM WITH MINIMAL EXTERNAL REFRIGERATION

(71) Applicants: Larry Baxter, Orem, UT (US); Eric Mansfield, Spanish Fork, UT (US); Christopher Hoeger, Provo, UT (US)

(72) Inventors: Larry Baxter, Orem, UT (US); Eric Mansfield, Spanish Fork, UT (US); Christopher Hoeger, Provo, UT (US)

(73) Assignee: Hall Labs LLC, Provo, UT (US)

( * ) Notice: Subject to any disclaimer, the term of this patent is extended or adjusted under 35 U.S.C. 154(b) by 393 days.

(21) Appl. No.: 15/450,674

(22) Filed: Mar. 6, 2017

(65) Prior Publication Data

US 2018/0252469 A1    Sep. 6, 2018

(51) Int. Cl.
    *B01D 53/00*    (2006.01)
    *B01D 53/14*    (2006.01)
    *F25J 3/02*    (2006.01)

(52) U.S. Cl.
    CPC .......... *B01D 53/002* (2013.01); *B01D 53/14* (2013.01); *F25J 3/0266* (2013.01); *B01D 2257/402* (2013.01); *B01D 2257/404* (2013.01); *B01D 2257/504* (2013.01); *B01D 2257/702* (2013.01); *B01D 2258/0283* (2013.01); *F25J 2200/02* (2013.01); *F25J 2200/72* (2013.01); *F25J 2200/74* (2013.01); *F25J 2205/10* (2013.01); *F25J 2205/20* (2013.01); *F25J 2205/30* (2013.01); *F25J 2205/50* (2013.01); *F25J 2205/90* (2013.01); *F25J 2210/70* (2013.01); *F25J 2220/82* (2013.01); *F25J 2220/84* (2013.01); *F25J 2230/80* (2013.01); *F25J 2235/80* (2013.01); *F25J 2270/12* (2013.01); *F25J 2270/14* (2013.01);

(Continued)

(58) Field of Classification Search
    CPC .................. B01D 53/002; B01D 53/14; B01D 2258/0283; B01D 2257/702; B01D 2257/504; B01D 2257/404; B01D 2257/402; F25J 3/0266; F25J 2270/902; F25J 2270/60; F25J 2270/12; F25J 2235/80; F25J 2230/80; F25J 2220/84; F25J 220/82; F25J 2210/70; F25J 2205/90; F25J 2205/50; F25J 2205/30; F25J 2200/72; F25J 2200/02; F25J 2205/10; F25J 2205/20; F25J 2270/14; F25J 2200/74; Y02C 10/12
    See application file for complete search history.

(56) References Cited

U.S. PATENT DOCUMENTS

| | | | |
|---|---|---|---|
| 3,098,732 A * | 7/1963 | Dennis ..................... | F25J 1/004 62/637 |
| 6,212,891 B1 * | 4/2001 | Minta ..................... | C22C 38/04 62/50.7 |

(Continued)

*Primary Examiner* — Ljiljana V. Ciric (57) ABSTRACT

A process for removing a foulant from a gas stream. The gas stream is cooled in a series of heat exchangers, causing a portion of the foulant to desublimate and become entrained in a cryogenic liquid. This foulant slurry stream is pressurized, cooled, and separated into a pressurized foulant solid stream and the cryogenic liquid stream. The pressurized foulant solid stream is melted to produce a liquid foulant stream. Heat exchange processes, both internal and external, are provided that close the heat balance of the process. In this manner, the foulant is removed from the gas stream.

20 Claims, 4 Drawing Sheets

(52) U.S. Cl.
    CPC ...... *F25J 2270/60* (2013.01); *F25J 2270/902* (2013.01); *Y02C 10/12* (2013.01)

(56) References Cited

U.S. PATENT DOCUMENTS

| | | | | |
|---|---|---|---|---|
| 8,012,446 | B1* | 9/2011 | Wright | B01D 53/75 |
| | | | | 423/437.1 |
| 2007/0122328 | A1* | 5/2007 | Allam | B01D 53/60 |
| | | | | 423/235 |
| 2010/0077752 | A1* | 4/2010 | Papile | B01D 53/08 |
| | | | | 60/641.8 |
| 2012/0009105 | A1* | 1/2012 | White | B01D 53/002 |
| | | | | 423/235 |
| 2012/0009106 | A1* | 1/2012 | Petrocelli | B01D 53/002 |
| | | | | 423/235 |
| 2013/0111948 | A1* | 5/2013 | Higginbotham | F25J 3/04206 |
| | | | | 62/617 |
| 2014/0026750 | A1* | 1/2014 | Jain | B01D 53/04 |
| | | | | 95/96 |
| 2014/0135558 | A1* | 5/2014 | Kuzma, Jr. | C07C 7/005 |
| | | | | 585/809 |
| 2016/0059185 | A1* | 3/2016 | Naito | B01D 53/56 |
| | | | | 422/105 |
| 2016/0129389 | A1* | 5/2016 | Calafell | B01D 53/12 |
| | | | | 95/108 |
| 2018/0252469 | A1* | 9/2018 | Baxter | B01D 53/002 |
| 2018/0266762 | A1* | 9/2018 | Baxter | F25J 3/0209 |
| 2018/0283781 | A1* | 10/2018 | Baxter | B01D 53/002 |
| 2018/0306495 | A1* | 10/2018 | Baxter | B01D 53/265 |
| 2018/0306499 | A1* | 10/2018 | Baxter | B01D 53/002 |
| 2019/0257580 | A1* | 8/2019 | Baxter | F25J 3/0219 |

\* cited by examiner

METHOD FOR REMOVING A FOULANT FROM A GAS STREAM WITH MINIMAL EXTERNAL REFRIGERATION

This invention was made with government support under DE-FE0028697 awarded by The Department of Energy. The government has certain rights in the invention.

BACKGROUND

Field of the Invention

This invention relates generally to the field of foulant removal from a gas. Our immediate interest is in removal of a contaminant, such as carbon dioxide, from a carrier gas, such as flue gas.

Background

The art of cryogenic capture of foulants from carrier gases is relatively young. The ability to capture foulants like carbon dioxide is of great importance to environmentally sound industrial progress. However, the greatest difficulty in capturing foulants from gases is the excessive energy requirement. The ability to make a process that minimizes the energy costs for foulant capture is needed.

United States patent publication number 20140144178 to Terrien et al. teaches an optimized heat exchange for a carbon dioxide de-sublimation process. This differs from the present disclosure in that, in the prior disclosure, only carbon dioxide can be removed from the gas, expansion of a carbon dioxide poor gas stream is required, external refrigeration is required on the melting heat exchanger, the reverse Rankine cycle occurs in the melting and desublimating heat exchangers, no distillation column is utilized for heat exchange, and other process differences readily apparent to someone of normal skill in the art. This disclosure is pertinent and may benefit from the methods disclosed herein and is hereby incorporated for reference in its entirety for all that it teaches.

United States patent publication number 20120297821 to Baxter et al. teaches systems and methods for separating condensable vapors from light gases or liquids by recuperative cryogenic processes. This differs from the present disclosure in that, in the prior disclosure, external refrigeration is required on the melting heat exchanger, no distillation column is utilized, and other process differences readily apparent to someone of normal skill in the art. This disclosure is pertinent and may benefit from the methods disclosed herein and is hereby incorporated for reference in its entirety for all that it teaches.

SUMMARY

A process for removing a foulant from a gas stream is disclosed. The gas stream is cooled in a first heat exchanger to a first temperature that is above a frosting point of the foulant to form a cooled gas stream. The cooled gas stream is cooled in a second heat exchanger against a cryogenic liquid stream to a second temperature that is below the frosting point of the foulant. A portion of the foulant within the cooled gas stream de-sublimates, thereby forming a foulant depleted gas stream and a solid foulant stream, the solid foulant stream becomes entrained in the cryogenic liquid stream, forming a foulant slurry stream. The foulant slurry stream is withdrawn from the second heat exchanger. The foulant depleted gas stream is withdrawn from the second heat exchanger. The foulant slurry stream is pressurized and cooled across a third heat exchanger to produce a pressurized foulant slurry stream that is at or exceeds the triple point of the foulant. The pressurized foulant slurry stream is separated into a pressurized foulant solid stream and the cryogenic liquid stream. The pressurized foulant solid stream is melted in a melting heat exchanger to produce a liquid foulant stream. The liquid foulant stream is heated in the first heat exchanger to form a warmed foulant fluid stream. The warmed foulant fluid stream is provided to a side inlet of a distillation column. The distillation column separates the warmed foulant fluid stream into a cooled liquid overhead foulant stream and a warmed cryogenic liquid stream. The cooled liquid overhead foulant stream is provided to the melting heat exchanger to warm the pressurized solid foulant stream, causing the cooled liquid overhead foulant stream to cool into an overhead foulant stream. A portion of the overhead foulant stream is recycled to a top inlet of the distillation column, while the remainder of the overhead foulant stream is removed. A portion of the warmed cryogenic liquid stream is provided to a recycle warming heat exchanger. The balance of the warmed cryogenic liquid stream is cooled across the first heat exchanger to become a cooled cryogenic liquid recycle stream. The recycle warming heat exchanger warms the portion of the cooled cryogenic liquid stream before returning the portion of the warmed cryogenic liquid stream to a bottom inlet of the distillation column. A first portion of external refrigeration is provided to the first heat exchanger and the third heat exchanger using a first reverse Rankine refrigeration cycle having a first refrigerant. The first reverse Rankine refrigeration cycle comprises the steps of, a) compressing the first refrigerant, b) condensing the first refrigerant, c) expanding the first refrigerant, and d) vaporizing the first refrigerant. Step (b) occurs in the first heat exchanger, at a temperature near the foulant triple point such that the first refrigerant condenses. Step (d) occurs in the third heat exchanger. In this manner, the foulant is removed from the gas stream.

The cooled cryogenic liquid recycle stream may recombine in the second heat exchanger, the third heat exchanger, or the foulant slurry stream.

The foulant depleted gas stream may be warmed across the first heat ex-changer.

Step (b) may also include a supplemental ambient heat exchange process before the first heat exchanger. Step (d) may also include the first heat exchanger.

The first refrigerant may comprise ethane, methane, propane, R14, refrigerants, or combinations thereof.

A storage tank may be provided to store excess amounts of the first refrigerant.

A second portion of external refrigeration may be provided to the first heat exchanger using a second reverse Rankine refrigeration cycles having a second refrigerant. The second reverse Rankine refrigeration cycle comprises the steps of, a) compressing the second refrigerant, b) condensing the second refrigerant, c) expanding the second refrigerant, d) vaporizing the second refrigerant. Step (b) may occur in the first heat exchanger. Step (d) may occur in the first heat exchanger. Step (b) may also include a supplemental ambient heat exchange process. Step (b) may also include at least two ambient heat exchangers in parallel before the first heat exchanger. The at least two ambient heat exchangers may operate at different pressures. The different pressures match different portions of a heat exchange process curve for the second refrigerant.

The second refrigerant may comprise ethane, methane, propane, R14, refrigerants, or combinations thereof.

The foulant product may be provided to a separation vessel and separated into an overhead vapor foulant product stream and a bottoms liquid foulant product stream. The bottoms liquid foulant product stream may be removed and pressurized. The overhead vapor foulant product stream may be removed, compressed, and then cooled across the first heat exchanger and recombined with the bottoms liquid foulant product stream and pressurized and warmed across the first heat exchanger.

The foulant product may be provided to a separation vessel and separated into an overhead vapor foulant product stream and a bottoms liquid foulant product stream. The bottoms liquid foulant product stream may be removed and pressurized. The overhead vapor foulant product stream may be warmed across the first heat exchanger, compressed, again cooled across the first heat exchanger, and then combined with the bottoms foulant product stream before being pressurized and warmed across the first heat exchanger.

The cryogenic liquid may comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

The foulant may comprise carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid, or combinations thereof.

The second heat exchanger may comprise a spray tower, hail tower, bubbler, fluidized bed, or combinations thereof.

The foulant slurry stream may be pressurized by a pump preceding the third heat exchanger.

The pressurized foulant slurry stream may be separated into the pressurized foulant solid stream and the cryogenic liquid stream by a device comprising a screw press, rollers, a mangle, a filter press, or combinations thereof.

The third heat exchanger may be a non-fouling heat exchanger.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
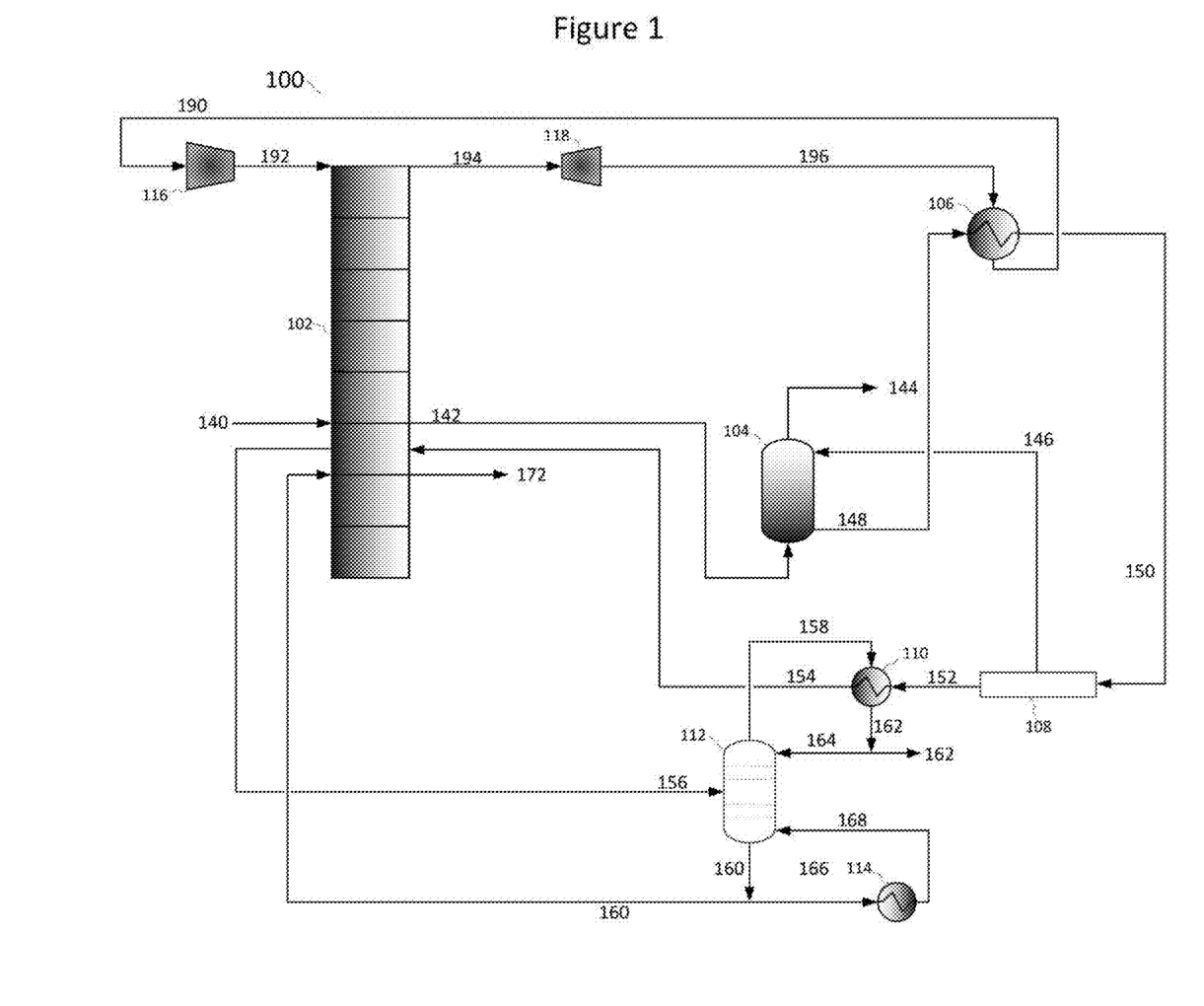
FIG. 1 shows a process flow diagram for removing a foulant from a gas stream.

Referring to FIG. 1, a process flow diagram 100 is shown, as per one embodiment of the present invention. Gas stream 140, containing a foulant, is cooled across first heat exchanger 102 to a first temperature that is above a frosting point of the foulant, forming cooled gas stream 142. Cooled gas stream 142 is cooled by contact with cryogenic liquid stream 110 in second heat exchanger 104 to a second temperature, below the frosting point of the foulant, causing a portion of the foulant within cooled compressed stream 142 to desublimate, forming foulant depleted gas stream 144 and a solid foulant stream. Foulant depleted gas stream 144 leaves second heat exchanger 104 as a product. The solid foulant stream becomes entrained in cryogenic liquid stream 146, forming foulant slurry stream 148. Foulant slurry stream 148 is withdrawn from second heat exchanger 104, pressurized, and provided to third heat exchanger 106, where it is cooled to form pressurized foulant slurry stream 150, that is at or exceeds the triple point of the foulant. Pressurized foulant slurry stream 150 is separated into pressurized foulant solid stream 152 and cryogenic liquid stream 146 by separator 108. Pressurized foulant solid stream 152 is melted in melting heat exchanger 110 to produce liquid foulant stream 154. Liquid foulant stream 154 is heated across first heat exchanger 102 to form warmed foulant fluid stream 156. Warmed foulant fluid stream 156 is provided to a side inlet of distillation column 112. Distillation column 112 separates warmed foulant fluid stream 156 into cooled liquid overhead foulant stream 158 and warmed cryogenic liquid stream 160. Cooled liquid overhead foulant stream 158 is provided as heating for melting heat exchanger 110, producing overhead foulant stream 162. A portion of overhead foulant stream 162 is recycled to a top inlet of distillation column 112 as overhead recycle stream 164, while the remainder is removed. A portion of warmed cryogenic liquid stream 160 is provided to recycle warming heat exchanger 114 as recycle cryogenic liquid stream 166 and warmed to produce warmed cryogenic liquid stream 168, which is recycled to a bottom inlet of distillation column 112. The remainder of warmed cryogenic liquid stream 160 is cooled across first heat exchanger 102, producing cooled cryogenic liquid recycle stream 172 as a product. A first portion of external refrigeration is provided using a first reverse Rankine refrigeration cycle having first refrigerant 190. This cycle consists of compressing first refrigerant 190 in first cycle compressor 116 to first compressed refrigerant 192. First compressed refrigerant 192 is cooled across first heat exchanger 102 to first cooled compressed refrigerant 194. First cooled compressed refrigerant 194 is expanded across first cycle expander 118 to form first expanded refrigerant 196, which is used as coolant in third heat exchanger 106, forming first refrigerant 190. In this manner, the foulant is removed from gas stream 140.

Figure 2:
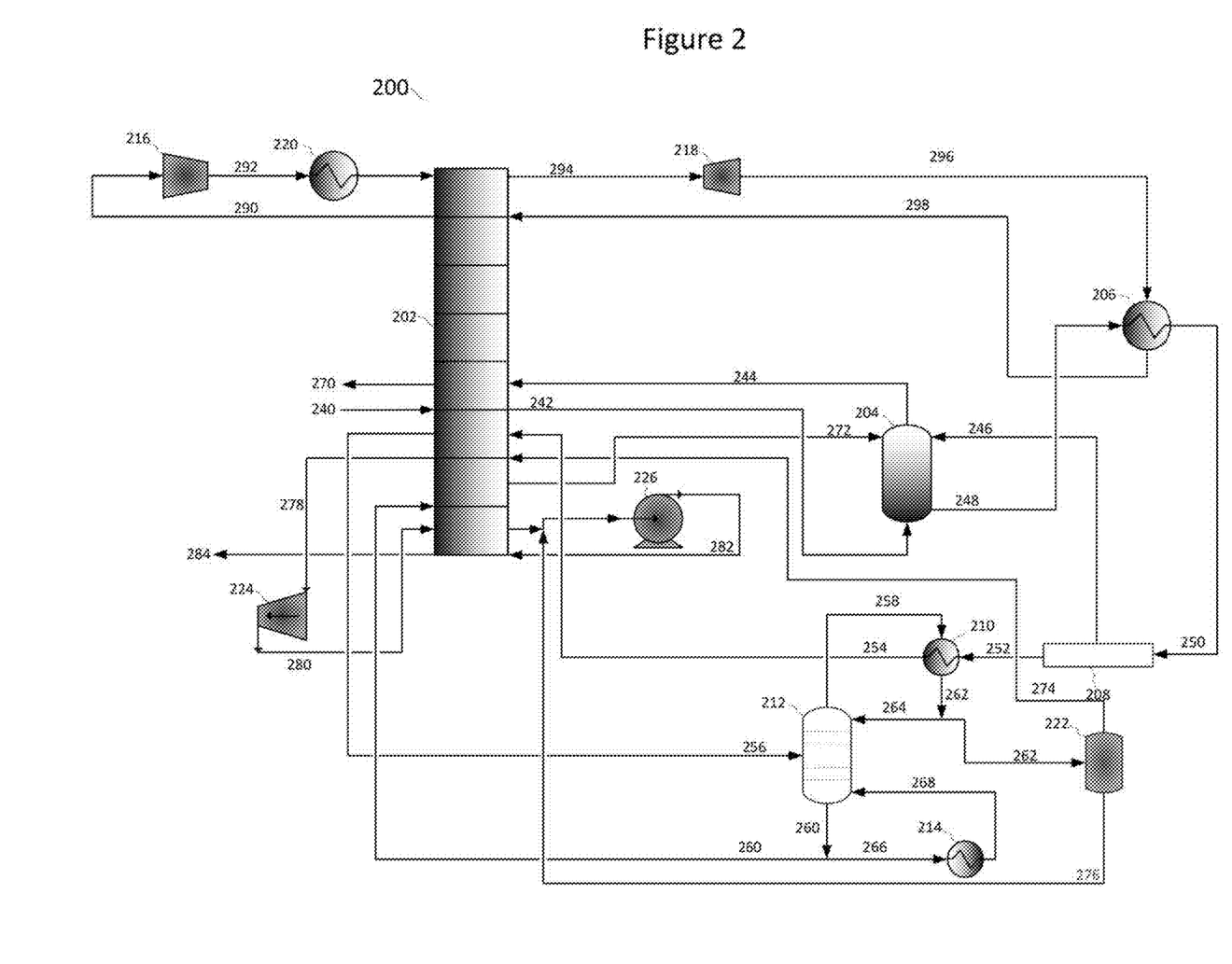
FIG. 2 shows a process flow diagram for removing a foulant from a gas stream.

Referring to FIG. 2, a process flow diagram 200 is shown, as per one embodiment of the present invention. Gas stream 240, containing a foulant, is cooled across first heat exchanger 202 to a first temperature that is above a frosting point of the foulant, forming cooled gas stream 242. Cooled gas stream 242 is cooled by contact with cryogenic liquid stream 210 and cooled cryogenic liquid recycle stream 262 in second heat exchanger 204 to a second temperature, below the frosting point of the foulant, causing a portion of the foulant within cooled compressed stream 242 to desublimate, forming foulant depleted gas stream 244 and a solid foulant stream. Foulant depleted gas stream 244 leaves second heat exchanger 204 and is warmed across warmed across first heat exchanger 202 to produce warmed foulant depleted gas stream 270. The solid foulant stream becomes entrained in cryogenic liquid stream 246, forming foulant slurry stream 248. Foulant slurry stream 248 is withdrawn from second heat exchanger 204, pressurized, and provided to third heat exchanger 206, where it is cooled to form pressurized foulant slurry stream 250, that is at or exceeds the triple point of the foulant. Pressurized foulant slurry stream 250 is separated into pressurized foulant solid stream 252 and cryogenic liquid stream 246 by separator 208. Pressurized foulant solid stream 252 is melted in melting heat exchanger 210 to produce liquid foulant stream 254. Liquid foulant stream 254 is heated across first heat exchanger 202 to form warmed foulant fluid stream 256. Warmed foulant fluid stream 256 is provided to a side inlet of distillation column 212. Distillation column 212 separates warmed foulant fluid stream 256 into cooled liquid overhead foulant stream 258 and warmed cryogenic liquid stream 260. Cooled liquid overhead foulant stream 258 is provided as heating for melting heat exchanger 210, producing overhead foulant stream 262. A portion of overhead foulant stream 262 is recycled to a top inlet of distillation column 212 as overhead recycle stream 264, while the remainder is provided to separation vessel 222, separating into overhead vapor foulant product stream 274 and bottoms liquid foulant product stream 276. Overhead vapor foulant product stream 274 is warmed across first heat exchanger 202 to produce warmed overhead vapor foulant product stream 278, which is compressed across compressor 224 to produce compressed overhead foulant product stream 280. Compressed overhead foulant product stream 280 is cooled across first heat exchanger 202 and combined with bottoms liquid foulant product stream 276, then pressurized through foulant pump 226 to produce pressurized foulant product 282. Pressurized foulant product 282 is warmed across first heat exchanger 202 to produce final liquid foulant product 284. A portion of warmed cryogenic liquid stream 260 is provided to recycle warming heat exchanger 214 as recycle cryogenic liquid stream 266 and warmed to produce warmed cryogenic liquid stream 268, which is recycled to a bottom inlet of distillation column 212. The remainder of warmed cryogenic liquid stream 260 is cooled across first heat exchanger 202, producing cooled cryogenic liquid recycle stream 272, which is provided to second heat exchanger 204. A first portion of external refrigeration is provided using a first reverse Rankine refrigeration cycle having first refrigerant 290. This cycle consists of compressing first refrigerant 290 in first cycle compressor 216 to first compressed refrigerant 292. First compressed refrigerant 292 is cooled across a first ambient heat exchanger 220 and across first heat exchanger 202 to produce first cooled compressed refrigerant 294. First cooled compressed refrigerant 294 is expanded across first cycle expander 218 to form first expanded refrigerant 296, which is used as coolant in third heat exchanger 206, forming first warmed expanded refrigerant 298, which is warmed further across first heat exchanger 202 to form first refrigerant 290. In this manner, the foulant is removed from gas stream 240. In some embodiments, cooled cryogenic liquid recycle stream 272 is sent to third heat exchanger 206, or combined with foulant slurry stream 248. In some embodiments, compressor 224 is bypassed.

Figure 3:
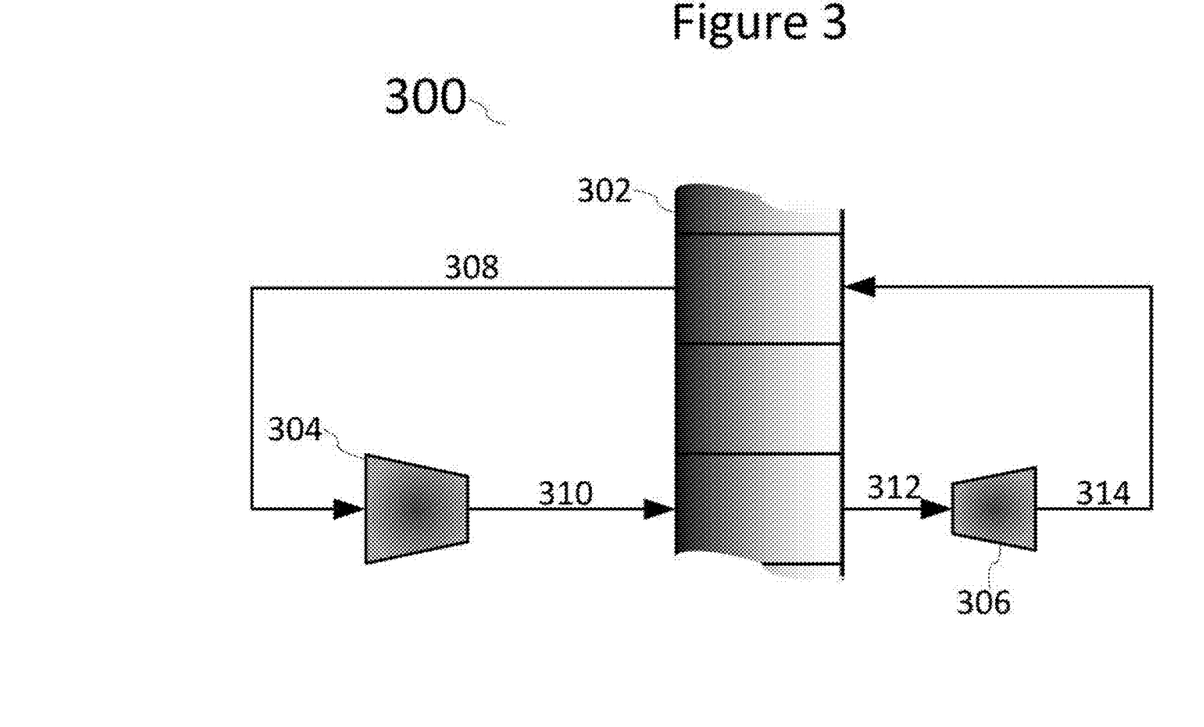
FIG. 3 shows a process flow diagram for a second portion of external refrigeration.

Referring to FIG. 3, a process flow diagram of a second portion of external refrigeration provided to first heat exchanger 102 or 202, as in FIGS. 1 and 2, is shown at 300, as per one embodiment of the present invention. A portion of first heat exchanger 302 is shown, with the first portion of external refrigeration and the process streams not shown. The second portion of external refrigeration utilizes a second reverse Rankine refrigeration cycle having a second refrigerant 320. The second reverse Rankine refrigeration cycle comprises the steps of, a) compressing the second refrigerant, b) condensing the second refrigerant, c) expanding the second refrigerant, and d) vaporizing the second refrigerant. Steps (b) and (d) are both conducted in first heat exchanger 302. Second refrigerant 308 is provided to second cycle compressor 304 to produce compressed second refrigerant 310, which is then cooled across first heat exchanger 302, to produce cooled second refrigerant 312. Cooled second refrigerant 312 is expanded through second cycle expander 306 to produce expanded second refrigerant 314, which is cooled across first heat exchanger 302 to produce second refrigerant 308.

Figure 4:
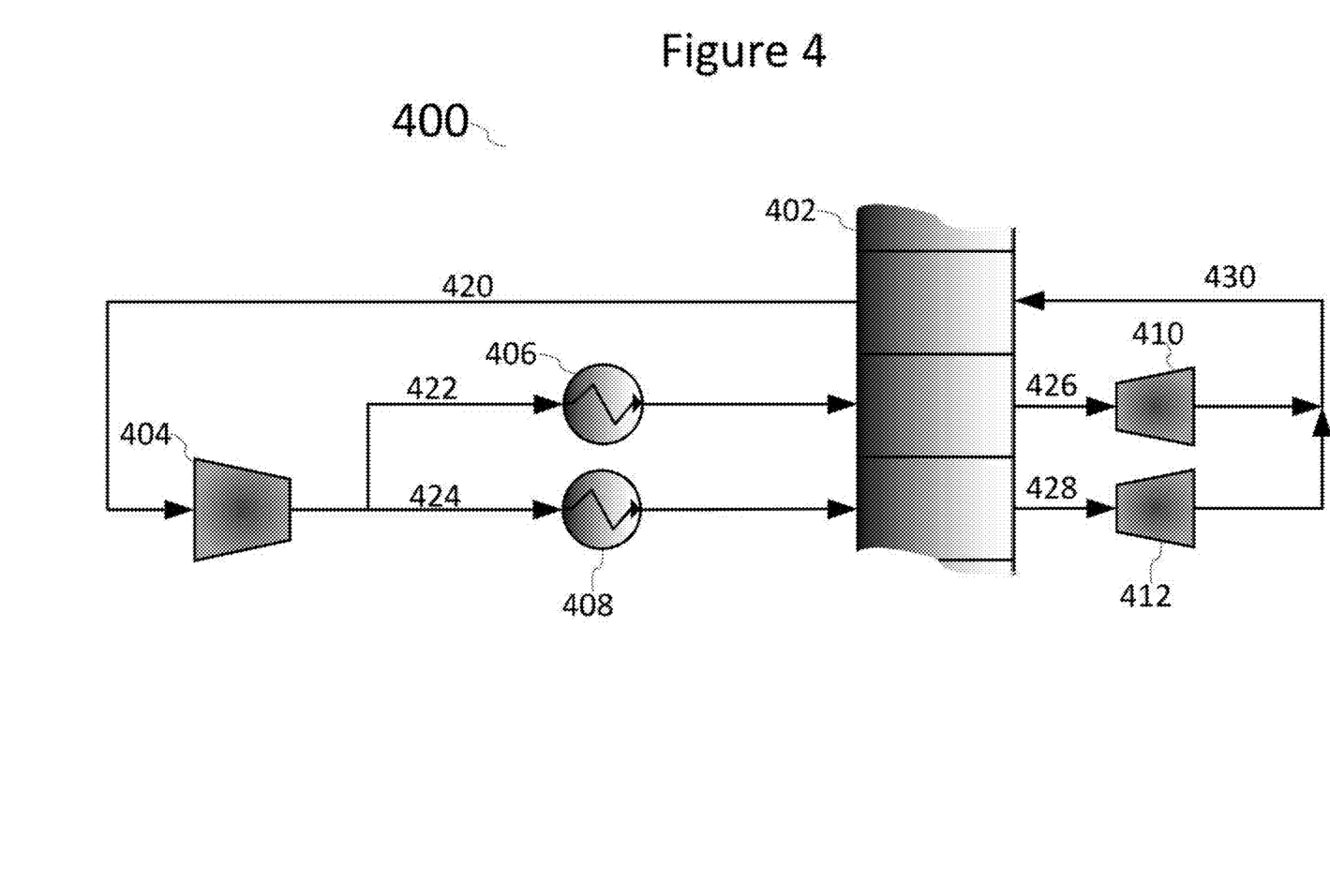
FIG. 4 shows a process flow diagram for a second portion of external refrigeration.

Referring to FIG. 4, a process flow diagram of a second portion of external refrigeration provided to first heat exchanger 102 or 202, as in FIGS. 1 and 2, is shown at 400, as per one embodiment of the present invention. A portion of first heat exchanger 402 is shown, with the first portion of external refrigeration and the process streams not shown. The second portion of external refrigeration utilizes a second reverse Rankine refrigeration cycle having a second refrigerant 420. The second reverse Rankine refrigeration cycle comprises the steps of, a) compressing the second refrigerant, b) condensing the second refrigerant, c) expanding the second refrigerant, and d) vaporizing the second refrigerant. Step (b) is conducted in first heat exchanger 402 and supplemental ambient heat exchangers 406 and 408. Step (d) is conducted in first heat exchanger 402. Second refrigerant 420 is provided to second cycle compressor 404 and split into two portions to produce compressed second refrigerants 422 and 424. Compressed second refrigerant 422 is cooled across first supplemental ambient heat exchanger 406 and first heat exchanger 402, and compressed second refrigerant 424 is cooled across second supplemental ambient heat exchanger 408 and first heat exchanger 402, to produce cooled second refrigerants 426 and 428, respectively. Cooled second refrigerants 426 and 428 are expanded through second cycle expanders 410 and 412 and then recombined to produce expanded second refrigerant 430. Expanded second refrigerant 430 is cooled across first heat exchanger 402 to produce second refrigerant 420. The ambient heat exchangers 406 and 408 are operated at different pressures to match different portions of the heat exchange process curve for the second refrigerant. In some embodiments, only one ambient heat exchanger is used.

In some embodiments, first refrigerants 190 and 290 comprise ethane, methane, propane, R14, refrigerants, or combinations thereof. In some embodiments, a storage tank is provided to store excess amounts of the first refrigerant.

In some embodiments, second refrigerants 308 and 420 comprise ethane, methane, propane, R14, refrigerants, or combinations thereof.

In some embodiments, cryogenic liquids 146 and 246 comprises 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the foulant comprises carbon dioxide, nitrogen oxide, sulfur dioxide, nitrogen dioxide, sulfur trioxide, hydrogen sulfide, hydrogen cyanide, water, hydrocarbons with a freezing point above the temperature of the cryogenic liquid.

In embodiments where the foulant comprises carbon dioxide, cooled liquid overhead foulant streams 158 and 258 have a temperature profile match for the heat exchange process with pressurized foulant solid stream 152 and 252.

In some embodiments, second heat exchangers 104 and 204 comprise a spray tower, hail tower, bubbler, fluidized bed, or combinations thereof.

In some embodiments, foulant slurry stream 148 and 248 are pressurized by a pump preceding the third heat exchanger.

In some embodiments, separators 108 and 208 comprise a screw press, rollers, a mangle, a filter press, or combinations thereof.

In some embodiments, third heat exchangers 106 and 206 may be non-fouling heat exchanger.

The invention claimed is:

1. A process for removing a foulant from a gas stream, the process comprising:
    cooling the gas stream having the foulant in a first heat exchanger to a first temperature that is above a frosting point of the foulant to form a cooled gas stream;
    cooling the cooled gas stream in a second heat exchanger against a cryogenic liquid stream to a second temperature that is below the frosting point of the foulant, wherein a portion of the foulant within the cooled gas stream de-sublimates, thereby forming a foulant depleted gas stream and a solid foulant stream, the solid foulant stream becoming entrained in the cryogenic liquid stream, forming a foulant slurry stream;
    withdrawing the foulant slurry stream from the second heat exchanger;
    withdrawing the foulant depleted gas stream from the second heat exchanger;
    pressurizing the foulant slurry stream and cooling the foulant slurry stream across a third heat exchanger to produce a pressurized foulant slurry stream that is at or exceeds the triple point of the foulant;
    separating the pressurized foulant slurry stream into a pressurized foulant solid stream and the cryogenic liquid stream;
    melting the pressurized foulant solid stream in a melting heat exchanger to produce a liquid foulant stream;
    heating the liquid foulant stream in the first heat exchanger to form a warmed foulant fluid stream;
    providing the warmed foulant fluid stream to a side inlet of a distillation column, wherein the distillation column separates the warmed foulant fluid stream into a cooled liquid overhead foulant stream and a warmed cryogenic liquid stream;
    providing the cooled liquid overhead foulant stream to the melting heat exchanger to warm the pressurized solid foulant stream, causing the cooled liquid overhead foulant stream to cool into an overhead foulant stream, wherein a portion of the overhead foulant stream is recycled to a top inlet of the distillation column, while the remainder of the overhead foulant stream is removed;
    providing a portion of the warmed cryogenic liquid stream to a recycle warming heat exchanger, while the balance of the warmed cryogenic liquid stream is cooled across the first heat exchanger to become a cooled cryogenic liquid recycle stream, wherein the recycle warming heat exchanger warms the portion of the cooled cryogenic liquid stream before returning the portion of the warmed cryogenic liquid stream to a bottom inlet of the distillation column;
    providing a first portion of external refrigeration to the first heat exchanger and the third heat exchanger using a first reverse Rankine refrigeration cycle having a first refrigerant, wherein the first reverse Rankine refrigeration cycle comprises the steps of:
        a. compressing the first refrigerant;
        b. condensing the first refrigerant;
        c. expanding the first refrigerant;
        d. vaporizing the first refrigerant;
        wherein step (b) occurs in the first heat exchanger, at a third temperature near the foulant triple point such that the first refrigerant condenses,
        wherein step (d) occurs in the third heat exchanger;
    whereby the foulant is removed from the gas stream.

2. The method of claim 1, wherein the cooled cryogenic liquid recycle stream recombines in a location comprising the second heat exchanger, the third heat exchanger, or the foulant slurry stream.

3. The method of claim 1, wherein the foulant depleted gas stream is warmed across the first heat ex-changer.

4. The method of claim 1, wherein step (b) also includes a supplemental ambient heat exchange process before the first heat exchanger.

5. The method of claim 1, wherein step (d) also includes the first heat exchanger.

6. The method of claim 1, wherein the first refrigerant comprises ethane, methane, propane, R14, refrigerants, or combinations thereof.

7. The method of claim 6, wherein a storage tank is provided to store excess amounts of the first refrigerant.

8. The method of claim 1, wherein a second portion of external refrigeration is provided to the first heat exchanger using a second reverse Rankine refrigeration cycles having a second refrigerant, wherein the second reverse Rankine refrigeration cycle comprises the steps of:

a. compressing the second refrigerant;
b. condensing the second refrigerant;
c. expanding the second refrigerant;
d. vaporizing the second refrigerant;
wherein step (b) occurs in the first heat exchanger;
wherein step (d) occurs in the first heat exchanger.

9. The method of claim 8, wherein step (b) also includes a supplemental ambient heat exchange process.

10. The method of claim 8, wherein the second refrigerant comprises ethane, methane, propane, R14, refrigerants, or combinations thereof.

11. The method of claim 8, wherein step (b) also includes at least two ambient heat exchangers in parallel before the first heat exchanger.

12. The method of claim 11, wherein the at least two ambient heat exchangers operate at different pressures, the different pressures matching different portions of a heat exchange process curve for the second refrigerant.

13. The method of claim 1, wherein the foulant product is provided to a separation vessel and separated into an overhead vapor foulant product stream and a bottoms liquid foulant product stream; the bottoms liquid foulant product stream is removed and pressurized; the overhead vapor foulant product stream is removed, compressed, and then warmed across the first heat exchanger and recombined with the bottoms liquid foulant product stream and pressurized and cooled across the first heat exchanger.

14. The method of claim 1, wherein the foulant product is provided to a separation vessel and separated into an overhead vapor foulant product stream and a bottoms liquid foulant product stream; the bottoms liquid foulant product stream is removed and pressurized; the overhead vapor foulant product stream is warmed across the first heat exchanger, compressed, cooled across the first heat exchanger, and then combined with the bottoms foulant product stream before being pressurized and warmed across the first heat exchanger.

15. The method of claim 1, wherein the cryogenic liquid comprises 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

16. The method of claim 1, wherein the foulant comprises carbon dioxide, nitrogen oxide, sulfur dioxide, nitrogen dioxide, sulfur trioxide, hydrogen sulfide, hydrogen cyanide, water, hydrocarbons with a freezing point above a temperature of the cryogenic liquid, or combinations thereof.

17. The method of claim 1, wherein the second heat exchanger comprises a spray tower, hail tower, bubbler, fluidized bed, or combinations thereof.

18. The method of claim 1, wherein the foulant slurry stream is pressurized by a pump preceding the third heat exchanger.

19. The method of claim 1, wherein the pressurized foulant slurry stream is separated into the pressurized foulant solid stream and the cryogenic liquid stream by a device comprising a screw press, rollers, a mangle, a filter press, or combinations thereof.

20. The method of claim 1, wherein the third heat exchanger is a non-fouling heat exchanger.

* * * * *